US012194758B2

(12) United States Patent
Kobayashi

(10) Patent No.: US 12,194,758 B2
(45) Date of Patent: Jan. 14, 2025

(54) PRINTING APPARATUS AND PRINTING METHOD

(71) Applicant: SEIKO EPSON CORPORATION, Tokyo (JP)

(72) Inventor: Takashi Kobayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 159 days.

(21) Appl. No.: 17/657,095

(22) Filed: Mar. 29, 2022

(65) Prior Publication Data

US 2022/0314636 A1 Oct. 6, 2022

(30) Foreign Application Priority Data

Mar. 30, 2021 (JP) ................................ 2021-056780

(51) Int. Cl.

*B41J 2/21* (2006.01)
*B41J 2/045* (2006.01)
*B41J 29/393* (2006.01)

(52) U.S. Cl.

CPC .......... *B41J 2/2142* (2013.01); *B41J 2/0451* (2013.01); *B41J 2/2139* (2013.01); *B41J 29/393* (2013.01)

(58) Field of Classification Search

CPC .... B41J 2/2142; B41J 2/2132; B41J 2/04586; B41J 2/04581; B41J 2/15; B41J 2/0451; B41J 2/2139; B41J 29/393; B41J 29/38; B41J 2/04571

See application file for complete search history.

(56) References Cited

U.S. PATENT DOCUMENTS

| | | | |
|---|---|---|---|
| 5,124,720 A | 6/1992 | Schantz |
| 9,022,506 B2 | 5/2015 | Asada |
| 9,144,994 B2 | 9/2015 | Sudo et al. |
| 2013/0328958 A1 | 12/2013 | Sudo |
| 2014/0139574 A1 | 5/2014 | Asada |

(Continued)

FOREIGN PATENT DOCUMENTS

| | | |
|---|---|---|
| JP | H04-226772 A | 8/1992 |
| JP | 2000-015790 | 1/2000 |
| JP | 2004-066742 A | 3/2004 |

(Continued)

*Primary Examiner* — Jannelle M Lebron
(74) *Attorney, Agent, or Firm* — WORKMAN NYDEGGER

(57) ABSTRACT

A printing apparatus configured to perform printing by a combination of transport of a printing medium by a transport unit and main scanning for discharging ink in association with movement of a scanning unit, wherein the control unit is configured to calculate, a one-time transport amount by the transport unit for each nozzle row at each of the nozzle row positions, the one-time transport amount being a complementary transport amount at which non-discharge of ink by the defective nozzle is complementable by discharge of ink by the normal nozzle, based on a relationship between the main scanning before the transport and the main scanning after the transport, determine a common transport amount to the nozzle rows at the respective nozzle row positions based on the complementary transport amount for each nozzle row, and perform the printing the determined common transport amount as the one-time transport amount by the transport unit.

6 Claims, 10 Drawing Sheets

(56) References Cited

U.S. PATENT DOCUMENTS

| | | | | |
|---|---|---|---|---|
| 2015/0202876 | A1 * | 7/2015 | Tamai | B41J 2/2132<br>347/14 |
| 2016/0144613 | A1 * | 5/2016 | Fukazawa | B41J 2/0451<br>347/14 |

FOREIGN PATENT DOCUMENTS

| | | | |
|---|---|---|---|
| JP | 2013-215900 | A | 10/2013 |
| JP | 2013-256009 | | 12/2013 |
| JP | 2014-100825 | | 6/2014 |

* cited by examiner

PRINTING APPARATUS AND PRINTING METHOD

The present application is based on, and claims priority from JP Application Serial Number 2021-056780, filed Mar. 30, 2021, the disclosure of which is hereby incorporated by reference herein in its entirety.

BACKGROUND

1. Technical Field

The present disclosure relates to a printing apparatus and a printing method.

2. Related Art

In an inkjet printer, when ink thickens in a nozzle contained in a print head and an air bubble, dust, etc. are mixed in the nozzle, clogging occurs in the nozzle, and such a nozzle becomes a so-called defective nozzle that cannot normally discharge the ink. The defective nozzle creates dot missing in the printing result.

A technique for complementing the missing of printing by the defective nozzle with a normal nozzle is known.

A printing apparatus is disclosed for performing printing by setting a plurality of regions by dividing each nozzle row into a first direction in which nozzles are aligned on the entire plurality of nozzle rows, determining whether a defective nozzle is included that has an obstacle to ink discharge in each set region, using a region determined to include the defective nozzle as an unused region, and using the remaining region excluding the unused region from the plurality of regions (JP-A-2013-215900).

In order to complement the defective nozzle with the normal nozzle, when a range of nozzles used for printing is determined in the nozzle row, the range of nozzles is greatly limited, which leads to a problem that a number of passes required for printing completion increases and the printing speed decreases.

SUMMARY

A printing apparatus including a transport unit configured to transport a printing medium in a transport direction, a print head including a nozzle row at each of a plurality of nozzle row positions, the nozzle row being constituted by a plurality of nozzles configured to discharge ink onto the printing medium, a scanning unit configured to move the print head in a main scanning direction that intersects with the transport direction, a control unit configured to control the transport unit, the print head, and the scanning unit, and a defective nozzle detection unit configured to detect a defective nozzle failing to discharge ink from a plurality of nozzles included in the print head, wherein the printing apparatus is configured to perform printing on the printing medium by a combination of transport by the transport unit and main scanning for discharging ink by the print head based on printing data in association with movement of the scanning unit, and the control unit is configured to calculate, based on a positional relationship between the defective nozzle and a normal nozzle that is not the defective nozzle included in the nozzle row in the transport direction, a one-time transport amount by the transport unit for each nozzle row at each of the nozzle row positions, the one-time transport amount being a complementary transport amount at which non-discharge of ink by the defective nozzle is complementable by discharge of ink by the normal nozzle, based on a relationship between the main scanning before the transport and the main scanning after the transport, determine a common transport amount to the nozzle rows at the respective nozzle row positions based on the complementary transport amount for each nozzle row, and perform the printing by adopting the determined common transport amount as the one-time transport amount by the transport unit.

A printing method for performing printing on a printing medium by a combination of transport of a printing medium in a transport direction and main scanning for discharging ink by a print head based on printing data in association with movement of the print head in a main scanning direction that intersects with the transport direction, the print head including a nozzle row at each of a plurality of nozzle row positions, the nozzle row being constituted by a plurality of nozzles configured to discharge ink onto the printing medium, the method including a defective nozzle detection step for detecting a defective nozzle failing to discharge ink from a plurality of nozzles included in the print head, a calculation step for calculating, based on a positional relationship between the defective nozzle and a normal nozzle that is not the defective nozzle included in the nozzle row in the transport direction, a one-time transport amount of the printing medium for each nozzle row at each of the nozzle row positions, the one-time transport amount being a complementary transport amount at which non-discharge of ink by the defective nozzle is complementable by discharge of ink by the normal nozzle, based on a relationship between the main scanning before the transport and the main scanning after the transport, a determination step for determining a common transport amount to the nozzle rows at the respective nozzle row positions based on the complementary transport amount for each nozzle row, and a printing step for performing the printing by adopting the determined common transport amount as the one-time transport amount.

DESCRIPTION OF EXEMPLARY EMBODIMENTS

Exemplary embodiments of the present disclosure will be described below with reference to the accompanying drawings. Note that each of the drawings is merely illustrative for describing the exemplary embodiment. Since the drawings are illustrative, proportions and shapes may not be precise, match each other, or some may be omitted.

1. Apparatus Configuration

Figure 1:
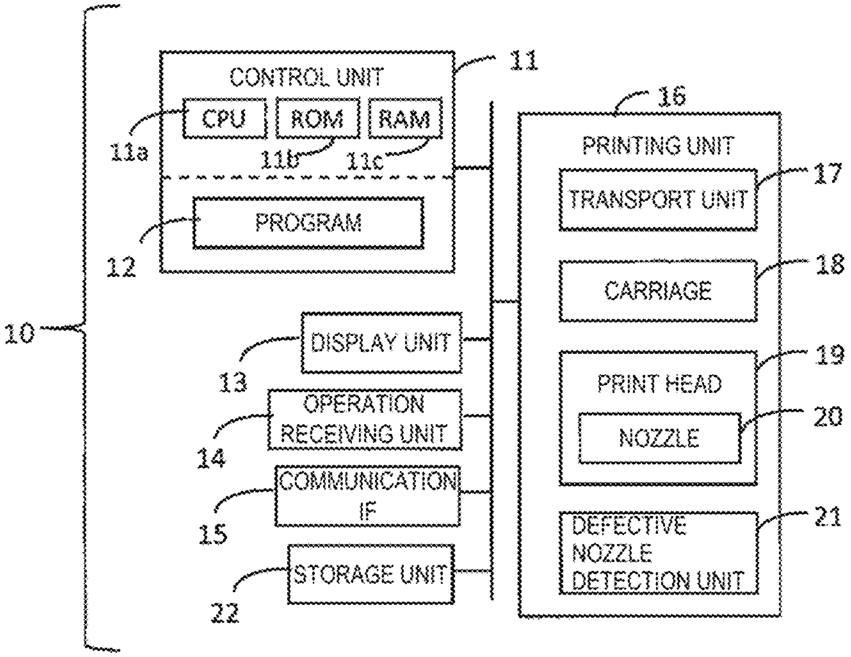
FIG. 1 is a block diagram illustrating a device configuration in a simplified manner.

FIG. 1 illustrates a configuration of a printing apparatus 10 according to the exemplary embodiment, in a simplified manner.

The printing apparatus 10 includes a control unit 11, a display unit 13, an operation receiving unit 14, a communication IF 15, a printing unit 16, a storage unit 22, etc. The printing unit 16 includes a transport unit 17, a carriage 18, a print head 19, a defective nozzle detection unit 21, etc. IF is an abbreviation for interface. The control unit 11 is configured to include, as a processor, one or more ICs including a CPU 11*a*, a ROM 11*b*, a RAM 11*c*, and the like, another non-volatile memory, and the like.

In the control unit 11, the processor, that is, the CPU 11*a* executes arithmetic processing in accordance with one or more programs 12 stored in the ROM 11*b*, the other memory, etc., using the RAM 11*c*, etc. as a work area, whereby controlling the printing apparatus 10. Note that the processor is not limited to the single CPU, and a configuration may be adopted in which the processing is performed by a hardware circuit such as a plurality of CPUs, an ASIC, or the like, or a configuration may be adopted in which the CPU and the hardware circuit work in concert to perform the processing.

The display unit 13 is a device for displaying visual information, and is configured, for example, by a liquid crystal display, an organic EL display, or the like. The display unit 13 may be configured to include a display and a drive circuit for driving the display. The operation receiving unit 14 is a device for receiving an operation by a user, and is realized, for example, by a physical button, a touch panel, a mouse, a keyboard, or the like. Of course, the touch panel may be realized as a function of the display unit 13.

The display unit 13 and the operation receiving unit 14 may be part of the configuration of the printing apparatus 10, or may be peripheral devices externally coupled to the printing apparatus 10. The communication IF 15 is a generic term for one or a plurality of IFs for coupling the printing apparatus 10 with the outside in a wired or wireless manner, in accordance with a prescribed communication protocol including a known communication standard provide.

The printing unit 16 is a mechanism for printing by an inkjet method.

The transport unit 17 is a means for transporting a printing medium such as paper in a predetermined transport direction, and includes a roller and a motor for rotating the roller, etc. Upstream and downstream in the transport direction are simply referred to below as upstream and downstream.

The print head 19 has a plurality of nozzles 20. The print head 19 prints an image on the printing medium by discharging or non-discharging dots of ink from the nozzles 20 based on printing data generated by the control unit 11 for printing an image with ink. The print head 19 is capable of discharging a plurality of colors of ink, such as cyan (C) ink, magenta (M) ink, yellow (Y) ink, black (K) ink, for example. Of course, the print head 19 may also discharge ink or liquid having a color other than CMYK.

The carriage 18 is a mechanism capable of reciprocating along a predetermined main scanning direction by receiving power from a carriage motor (not illustrated). The carriage 18 corresponds to a "scanning unit". The main scanning direction intersects with the transport direction. The intersection referred to here may be understood as orthogonal or almost orthogonal. The print head 19 is mounted on the carriage 18. In other words, the print head 19 reciprocates along with the carriage 18 along the main scanning direction.

The storage unit 22 is constituted by a storage device such as a hard disk drive or a solid state drive, for example. The storage unit 22 may include a memory included in the control unit 11. Furthermore, the storage unit 22 may be interpreted as a part of the control unit 11. The storage unit 22 stores various information necessary for the control of the printing apparatus 10.

Figure 2:
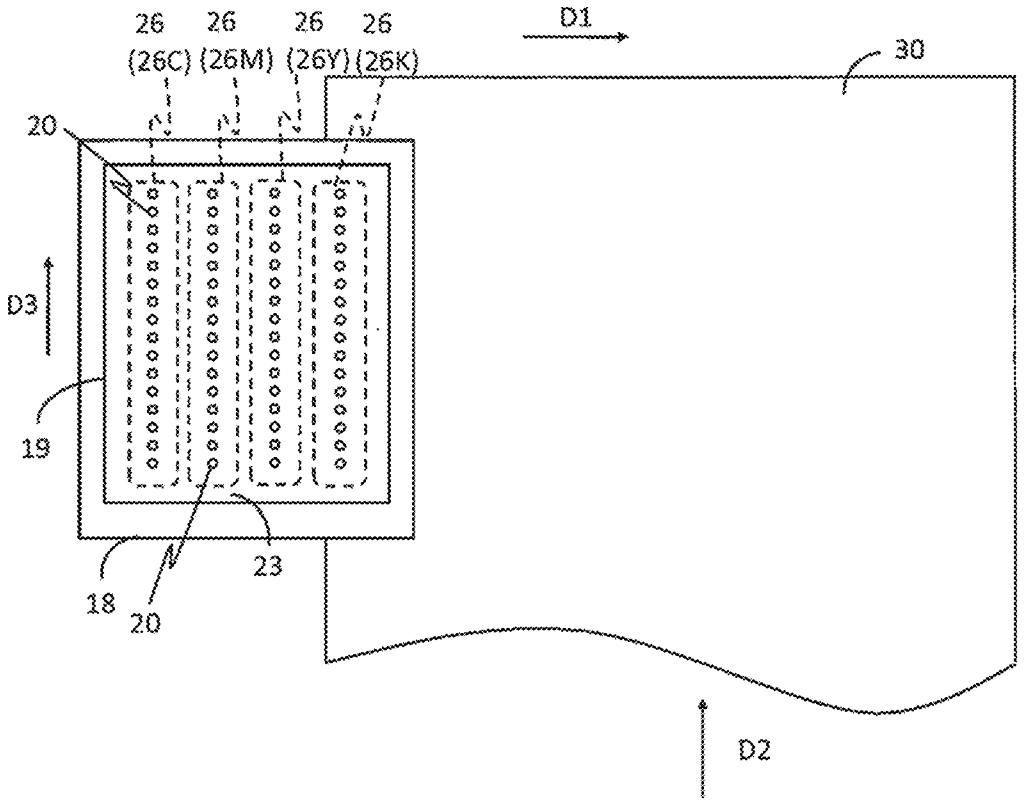
FIG. 2 is a diagram illustrating a relationship between a printing medium and a horizontal array head, as seen from above.

FIG. 2 simply illustrates a relationship between the printing medium 30 and the print head 19, as seen from above. The print head 19 mounted on the carriage 18 moves from one end to the other end of a main scanning direction D1 (outward movement) and moves from the other end to one end (return movement) together with the carriage 18. FIG. 2 illustrates an example of an array of the nozzles 20 on a nozzle surface 23. The nozzle surface 23 is a lower surface of the print head 19. Each small circle in the nozzle surface 23 corresponds to the nozzles 20.

The print head 19 includes nozzle rows 26 at each nozzle row position in a configuration in which ink for each color is supplied from a liquid holding unit (not illustrated) called an ink cartridge, an ink tank, etc. and discharged from the nozzle 20. FIG. 2 illustrates an example of the print head 19 that discharges CMYK ink. The nozzle row 26 including the nozzles 20 for discharging C ink is a nozzle row 26C. Similarly, the nozzle row 26 including the nozzles 20 for discharging M ink is a nozzle row 26M, the nozzle row 26 including the nozzles 20 for discharging Y ink is a nozzle row 26Y, and the nozzle row 26 including the nozzles 20 for discharging K ink is a nozzle row 26K.

In the example of FIG. 2, the nozzle rows 26C, 26M, 26Y, 26K are aligned along the main scanning direction D1. The print head 19 having a configuration in which the plurality of nozzle rows 26 with different colors are arranged along the main scanning direction D1 is also referred to as a "horizontal array head". In the horizontal array head, the plurality of nozzle rows 26 for each color are disposed at the same position in a transport direction D2. Therefore, in the horizontal array head, the nozzle row position is a different position in the main scanning direction D1. Further, the nozzle row 26 at each nozzle row position can be said to be the nozzle row 26 for each ink color. However, each nozzle row 26 at each nozzle row position may have ink of the same color, specifically, may be the nozzle row 26K that discharges the K ink. That is, the print head 19 may be a head that only corresponds to monochrome printing. Each of the nozzle rows 26C, 26M, 26Y correspond to a "chromatic nozzle row" that each discharge a chromatic color of ink. Furthermore, the nozzle row 26K corresponds to a "non-chromatic nozzle row" that discharges a non-chromatic color of ink.

Each of the nozzle rows 26 is constituted by the plurality of nozzles 20 for which a nozzle pitch, which is an interval between the nozzles 20 in the transport direction D2, is constant or substantially constant. The direction in which the plurality of nozzles 20 constituting the nozzle row 26 are aligned is referred to as a nozzle row direction D3. In the example of FIG. 2, the nozzle row direction D3 is parallel to the transport direction D2. In the configuration in which the nozzle row direction D3 is parallel with the transport direction D2, the nozzle row direction D3 and the main scanning direction D1 are orthogonal. However, the nozzle row direction D3 need not necessarily be parallel with the transport direction D2, and a configuration may be adopted in which the nozzle row direction D3 obliquely intersects the main scanning direction D1.

The operation in which the print head 19 discharges ink based on printing data along with movement of the carriage 18 along the main scanning direction D1 is referred to as "main scanning" or a "pass." The printing unit 16 completes printing on the printing medium 30 by combining the pass and transport of the printing medium 30 by the transport unit 17 in the transport direction D2.

The configuration of the printing apparatus 10 illustrated in FIG. 1 may be realized by a single printer, or may be realized by a plurality of communicatively coupled devices.

In other words, the printing apparatus 10 may be the printing system 10 in actuality. The printing system 10 includes, for example, a printing control device that functions as the control unit 11 and the storage unit 22, and a printer corresponding to the printing unit 16. A printing method according to the exemplary embodiment is realized in this way by the printing apparatus 10 or the printing system 10.

The defective nozzle detection unit 21 is a means for detecting a "defective nozzle" from the plurality of nozzles 20 included in the print head 19. The defective nozzle is a nozzle 20 that is not capable of discharging ink due to clogging, etc. even after the operation of ink discharge according to printing data is performed. The inability to discharge the ink includes a state in which the ink cannot be discharged at all, and the amount of liquid to be discharged is too small, etc. Further, the present disclosure includes a case where an amount of liquid to be discharged is normal, but the position where the amount of liquid lands on the printing medium 30 is shifted with respect to the target position, etc. The defective nozzle may be referred to as an abnormal nozzle, etc. A nozzle 20 that is not the defective nozzle is also referred to as a "normal nozzle".

Various types of detection of the defective nozzle by the defective nozzle detection unit 21 can be adopted as long as it is possible to determine and detect whether each nozzle 20 is the defective nozzle. The defective nozzle detection unit 21 adopts a laser method in which, for example, the light emitter and the print head 19 are aligned so that the laser light emitted from the light emitter and the ink flight path of the nozzle 20 to be inspected intersect with each other, and determines that the inspection target is the defective nozzle when the light shielding of the laser beam by the dot discharged from the nozzle 20 cannot be detected by the light receiver. Furthermore, the defective nozzle detection unit 21 may detect the defective nozzle using the technique disclosed in JP-A-2013-126776. Specifically, whether ink is discharged normally from each nozzle 20 is detected by measuring the waveform of the residual vibration of a partial configuration of the print head 19, such as a so-called vibration plate that bends in conjunction with the deformation of the driving element (piezoelectric element) due to the application of the drive signal in accordance with the printing data.

The defective nozzle detection unit 21 generates defective nozzle information describing whether the nozzle is a defective nozzle for each of the nozzles 20 by performing the defective nozzle detection process. The defective nozzle information is stored in the storage unit 22. The timing at which the defective nozzle detection unit 21 executes the defective nozzle detection process is not particularly limited. The defective nozzle detection unit 21 overwrites the defective nozzle information with the latest defective nozzle information at any time.

2. First Exemplary Embodiment

Figure 3:
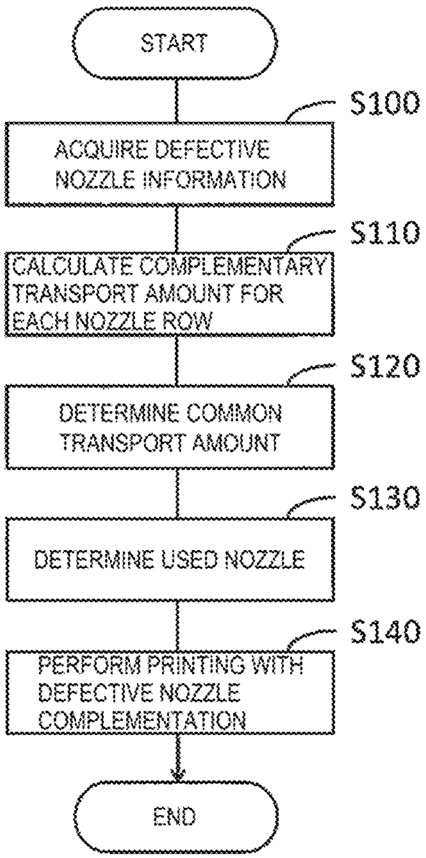
FIG. 3 is a flowchart illustrating a print control process of a first exemplary embodiment.

FIG. 3 illustrates, by a flowchart, a printing control process according to a first exemplary embodiment executed by the control unit 11 according to the program 12. The printing control process includes a printing method. In the first exemplary embodiment, the print head 19 is a horizontal array head.

In step S100, the control unit 11 accesses the storage unit 22 to acquire the defective nozzle information.

In step S110, the control unit 11 calculates a "complementary transport amount" for each nozzle row 26 with reference to the defective nozzle information. The complementary transport amount refers to a one-time transport amount by the transport unit 17, and refers to a transport amount at which non-discharge of ink by the defective nozzle is complementable by discharge of ink by the normal nozzle, based on a relationship between the main scanning before the transport and the main scanning after the transport. Note that, in the following, the distance or length refers to the distance or length in the transport direction D2, unless otherwise specified.

In the following, one-time transport by the transport unit 17 for printing is also referred to as "paper feeding". Therefore, the one-time transport amount by the transport unit 17 is a paper feeding amount. In addition, in a relationship of the main scanning for two times performed before the paper feeding and after the paper feeding, the main scanning performed earlier is referred to as a "leading pass", and the main scanning performed later is referred to as a "backward pass".

Figure 4:
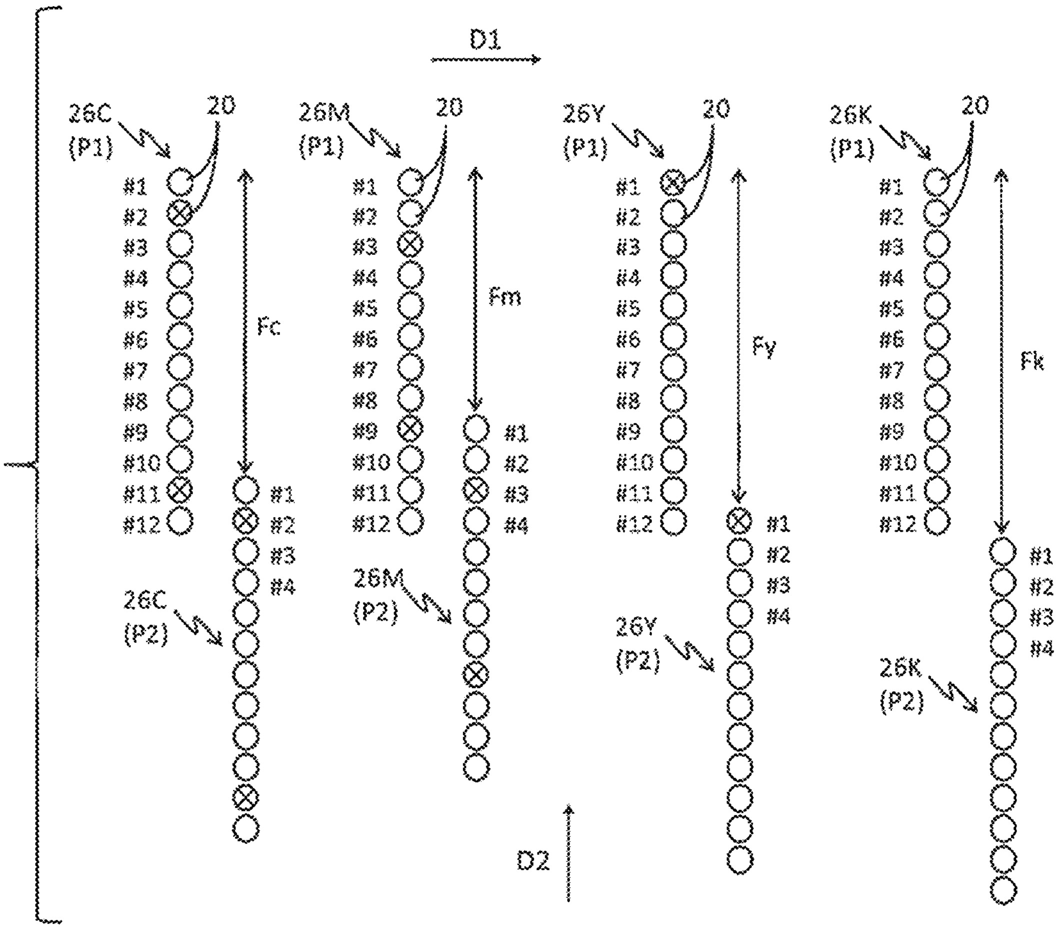
FIG. 4 is a diagram for describing a method for determining a complementary transport amount for each nozzle row.

FIG. 4 is a diagram for describing a method for determining the complementary transport amount for each nozzle row 26 in step S110. With reference to FIG. 4, one pass P1 is referred to as a leading pass P1 and the next pass 2 of the pass P1 is referred to as a backward pass P2. FIG. 4 illustrates the nozzle rows 26C, 26M, 26Y, 26K when performing the leading pass P1 and the nozzle rows 26C, 26M, 26Y, 26K when performing the backward pass P2 assuming the case where the complementary transport amount for each nozzle row 26 is applied. In the example of FIG. 4, for convenience of paper space, each of the nozzle rows 26C, 26M, 26Y, 26K is indicated by 12 nozzles 20. Of course, the number of nozzles that actually constitute the nozzle row 26 may be greater than 12. FIG. 4 also illustrates the main scanning direction D1 and the transport direction D2 in the same manner as in FIG. 2.

In FIG. 4, for convenience of explanation, each nozzle 20 constituting the nozzle rows 26C, 26M, 26Y, 26K is designated with a nozzle number in order from downstream to upstream, as #1, #2, #3 . . . #12. However, the nozzle number is appropriately omitted for the nozzle rows 26C, 26M, 26Y, 26K when performing the backward pass P2. In FIG. 4, the nozzle 20, which is a normal nozzle in the defective nozzle information, is indicated by a simple open circle, and the nozzle 20, which is a defective nozzle in the defective nozzle information, is indicated by a white circle marked with an X.

In FIG. 4, for each of the nozzle rows 26C, 26M, 26Y, 26K, the position at the time of performing the backward pass P2 is offset upstream from the position at the time of performing the leading pass P1, whereby the complementary transport amounts between the leading pass P1 and the backward pass P2 for each of the nozzle rows 26C, 26M, 26Y, 26K are represented. Of course, rather than the nozzle row 26 actually moving upstream, the printing medium 30 moves downstream by the paper feeding.

In step S110, the control unit 11 calculates the maximum complementary transport amount for the nozzle row 26 based on the positional relationship between the defective nozzle and the normal nozzle included in the nozzle row 26 in the transport direction D2.

First, attention is given to the nozzle row 26C. In the example of FIG. 4, in the nozzle row 26C, two nozzles 20 having a nozzle number #2 and a nozzle number #11 are defective nozzles. In the nozzle row 26C, 8 nozzles 20 of the nozzle numbers #3 to #10 are continuously normal nozzles, and therefore, using 8 nozzles 20 of the nozzle numbers #3 to #10 in each pass eliminates the use of the defective nozzle. In other words, if a distance of 8 times the nozzle pitch is taken as one-time paper feeding amount, 8 nozzles 20 of the nozzle numbers #3 to #10 can be used for printing in each pass.

However, such a distance of 8 times the nozzle pitch cannot be said to be the maximum complementary transport amount for the nozzle row 26C. According to the example of FIG. 4, for the position of the printing medium 30 where ink is not discharged due to the defective nozzle of the nozzle number #11 of the nozzle row 26C in the leading pass P1, the dot can be complemented by any normal nozzle downstream of this defective nozzle in the backward pass P2. In addition, according to the example of FIG. 4, for the position of the printing medium 30 where ink is not discharged due to the defective nozzle of the nozzle number #2 of the nozzle row 26C in the backward pass P2, the dot can be complemented by any normal nozzle upstream of this defective nozzle in the leading pass P1. Therefore, in the example of FIG. 4, a distance of 10 times the nozzle pitch is the maximum complementary transport amount Fc for the nozzle row 26C, which corresponds to the distance from the defective nozzle of the nozzle number #11 to the normal nozzle of nozzle number #1 farthest downstream in the nozzle row 26C, and the distance from the defective nozzle of the nozzle number #2 to the normal nozzle of nozzle number #12 farthest upstream in the nozzle row 26C.

In the relationship between the leading pass and the backward pass, two nozzles 20 corresponding to the same position of the printing medium 30 in the same nozzle row 26 are referred to as a "paired nozzle". That is, when the defective nozzle becomes the paired nozzle together with the normal nozzle, complementation is established. When the defective nozzles becomes the paired nozzle, the complementation is not established.

In step S110, the control unit 11 determines the maximum complementary transport amount for each of the nozzle rows 26M, 26Y, 26K.

In the example of FIG. 4, in the nozzle row 26M, two nozzles 20 of the nozzle number #3 and nozzle number #9 are defective nozzles. In the nozzle row 26M, five nozzles 20 of the nozzle numbers #4 to #8 are continuously normal nozzles, and therefore, if a distance of 5 times the nozzle pitch is taken as one-time paper feeding amount, 5 normal nozzles of the nozzle numbers #4 to #8 can be used for printing in each pass.

However, such a distance of 5 times the nozzle pitch cannot be said to be the maximum complementary transport amount for the nozzle row 26M. According to the example of FIG. 4, for the position of the printing medium 30 where ink is not discharged due to the defective nozzle of the nozzle number #9 of the nozzle row 26M in the leading pass P1, the dot can be complemented by the normal nozzle with the nozzle number #1, which is the furthest downstream from this defective nozzle in the backward pass P2. In other words, the two nozzles 20 of nozzle numbers #1, #9 in the nozzle row 26M can be the paired nozzle. In addition, for the position of the printing medium 30 where ink is not discharged due to the defective nozzle of the nozzle number #3 of the nozzle row 26M in the backward pass P2, the dot can be complemented by the normal nozzle with the nozzle number #11 upstream of this defective nozzle in the leading pass P1. Therefore, in the example of FIG. 4, a distance of 8 times the nozzle pitch is the maximum complementary transport amount Fm for the nozzle row 26M, which corresponds to the distance from the defective nozzle of the nozzle number #9 to the normal nozzle of the nozzle number #1 downstream in the nozzle row 26M, and the distance from the defective nozzle of the nozzle number #3 to the normal nozzle of the nozzle number #11 upstream in the nozzle row 26M.

In the example of FIG. 4, in the nozzle row 26Y, only the nozzle 20 of the nozzle number #1 is the defective nozzle. With respect to the nozzle row 26Y, for the position of the printing medium 30 where ink is not discharged due to the defective nozzle of the nozzle number #1 in the backward pass P2, the dot can be simply complemented by the normal nozzle with the nozzle number #12, which is the most upstream from the defective nozzle in the leading pass P1. Therefore, in the example of FIG. 4, a distance of 11 times the nozzle pitch is the maximum complementary transport amount Fy for the nozzle row 26Y, which corresponds to the distance from the defective nozzle of the nozzle number #1 to the normal nozzle of the nozzle number #12 upstream in the nozzle row 26Y.

In the example of FIG. 4, there is no defective nozzle in the nozzle row 26K. The term "complementary" is unnecessary when there is no defective nozzle, but here, the expression of the "complementary transport amount" is used for the nozzle row 26K in accordance with the other nozzle rows 26C, 26M, 26Y having defective nozzles. With respect to the nozzle row 26K, a distance of 12 times the nozzle pitch is the maximum complementary transport amount Fk, which corresponds to the length of the nozzle row 26.

In step S120, the control unit 11 determines the transport amount common to each nozzle row 26 at each nozzle row position, based on the complementary transport amount for each nozzle row 26 calculated in step S110. According to FIG. 4, since the maximum complementary transport amount for each of the nozzle rows 26C, 26M, 26Y, 26K is the complementary transport amount Fc, Fm, Fy, Fk, the control unit 11 may determine the smallest complementary transport amount Fm among these complementary transport amounts Fc, Fm, Fy, Fk to the common transport amount.

However, in a case where the smallest complementary transport amount Fm in the complementary transport amounts Fm, Fm, Fy, Fk is set to the common transport amount and where a situation occurs in which the defective nozzles become the paired nozzle in any of the nozzle rows 26C, 26Y, 26K other than the nozzle row 26M for which the complementary transport amount Fm is calculated in step S110, the common transport amount needs to be adjusted to a smaller distance. In the nozzle row 26C, it is assumed that the three nozzles 20 of the nozzle numbers #3, #10, #11 are defective nozzles. In this case, the defective nozzles of the nozzle numbers #10, #11 are complemented by the normal nozzles of the nozzle numbers #1, #2, and the defective nozzle of the nozzle number #3 can be complemented by the normal nozzle of the nozzle number #12, so the complementary transport amount Fc of the nozzle row 26C is a distance of 9 times the nozzle pitch. In this case, the complementary transport amount Fm, which is the distance of 8 times the nozzle pitch, is still smaller than the complementary transport amount Fc, but when the complementary transport amount Fm is the common transport amount for each nozzle row 26, two nozzles 20 of the nozzle numbers #3, #11, which are defective nozzles, becomes the paired nozzle in the nozzle row 26C. Thus, the control unit 11 determines a common transport amount that is even smaller than the complementary transport amount Fm, and does not generate the paired nozzle of defective nozzles in all of the nozzle rows 26C, 26Y, 26K.

In step S130, the control unit 11 determines a "used nozzle" in each nozzle row 26 when printing using the common transport amount determined in step S120. The used nozzle is the nozzle 20 that is the normal nozzle and is used for printing. By use of printing, it is meant to assign printing data. The nozzle 20, which is the normal nozzle and is not used for printing, is referred to as an "unused nozzle".

Figure 5:
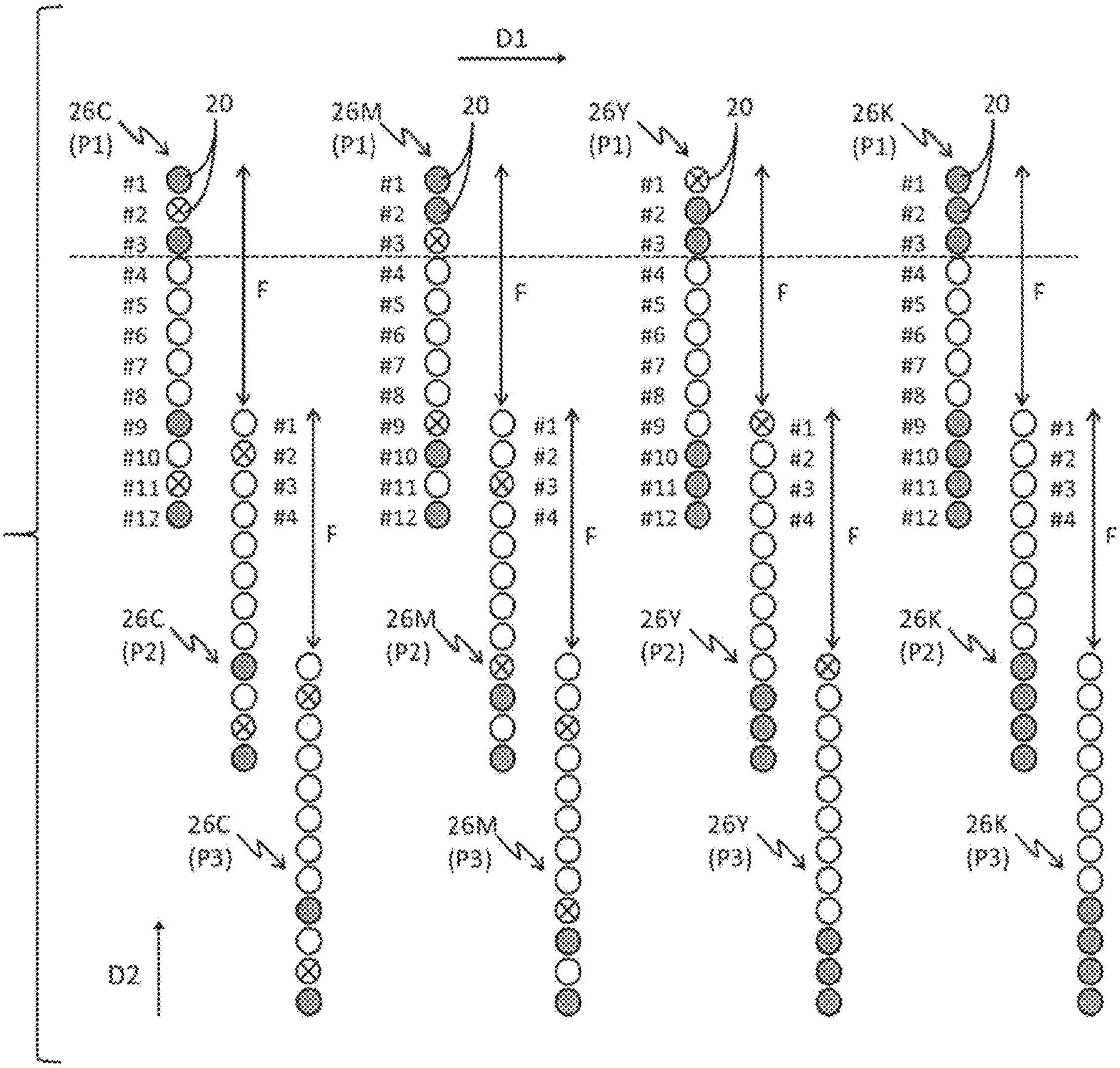
FIG. 5 is a diagram for describing a determination of a used nozzle for each nozzle row according to a common transport amount.

A specific example of step 130 will be described with reference to FIG. 5. In FIG. 5, as in FIG. 4 as well, the relative positions of the nozzle rows 26C, 26M, 26Y, 26K in the transport direction D2 and the printing medium 30 vary for each pass. The view of FIG. 5 is basically the same as FIG. 4. The defective nozzles in the nozzle rows 26C, 26M, 26Y, 26K illustrated in FIG. 5 are the same as in FIG. 4. In FIG. 5, the pass P1 is assumed to be a first pass for the printing medium 30. The pass P2 is a backward pass when the pass P1 is taken as a leading pass, and pass P3 is a backward pass when the pass P2 is taken as a leading pass.

In FIG. 5, the reference sign F denotes the common transport amount F determined in step S120, that is, the amount of paper feeding adopted for printing. Furthermore, the transport amount F is the complementary transport amount Fm illustrated in FIG. 4. In FIG. 5, the used nozzle is represented by a white circle, and the unused nozzle is represented by a gray color circle.

In a case where the transport amount F is adopted, the control unit 11 all uses the nozzles 20 that does not become the paired nozzle with the other nozzles 20 to be used as the used nozzles. According to FIG. 5, each nozzle 20 of the nozzle numbers #5 to #8 does not become the paired nozzle with other nozzles 20, and thus, in each of the nozzle rows 26C, 26M, 26Y, 26K, the control unit 11 sets each nozzle 20 of the nozzle numbers #5 to #8 to be the used nozzle.

In addition, in the case where the transport amount F is adopted, the control unit 11 naturally sets the normal nozzle, which becomes the paired nozzle with the defective nozzle, to be the used nozzle. According to FIG. 5, for example, the nozzle 20 of the nozzle number #10 of the nozzle row 26C becomes the paired nozzle with the defective nozzle of the nozzle number #2, to be the used nozzle. In addition, for example, the nozzle 20 of the nozzle number #1 of the nozzle row 26M becomes the paired nozzle with the defective nozzle of the nozzle number #9, to be the used nozzle. Further, the control unit 11 may use either normal nozzle as the used nozzle for the paired nozzle of the normal nozzles when the transport amount F is adopted, but in the example of FIG. 5, the normal nozzle belonging to the backward pass is used as the used nozzle. For example, while the two normal nozzles of the nozzle numbers #11, #3 in the nozzle row 26Y have a relationship as the paired nozzle, it is assumed that the nozzle 20 of the nozzle number #11 serving as a normal nozzle belonging to the leading pass is the unused nozzle, and that the nozzle 20 of the nozzle number #3 serving as a normal nozzle belonging to the backward pass is the used nozzle.

As a result of this step S130, according to the example in FIG. 5, the control unit 11 determines the 8 nozzles 20 of the nozzles numbers #1, #3 to #8, #10 in the nozzle row 26C to be the used nozzles. Also, in the nozzle row 26M, 8 nozzles 20 of the nozzle numbers #1, #2, #4 to #8, #11 are determined to be the used nozzles. In the nozzle row 26Y, 8 nozzles 20 of the nozzle numbers #2 to #9 are determined to be the used nozzles, and in the nozzle row 26K, 8 nozzles 20 of the nozzle numbers #1 to #8 are determined to be the used nozzles.

Further, in step S130, the control unit 11 determines the most downstream used nozzles common to each nozzle row 26 for the pass P1, which is the first pass. In the example in FIG. 4, 5, due to the defective nozzle of the nozzle number #3 of the nozzle row 26M, the most downstream nozzle 20 that can be commonly used in the nozzle rows 26C, 26M, 26Y, 26K in the pass P1, is each nozzle 20 of the nozzle number #4. Therefore, with respect to the pass P1, the control unit 11 uses the used nozzles of the nozzle number #4 or higher nozzle numbers among the used nozzles in each nozzle row 26 determined as described above for printing. That is, in pass P1, each used nozzle located upstream of the dashed line illustrated in FIG. 5 is used.

In step S140, the control unit 11 adopts the common transport amount determined in step S120, and performs printing based on the printing data by controlling the transport unit 17, the carriage 18, and the print head 19 using the used nozzles determined in each of the nozzle rows 26 in step S130. In other words, in the pass performed by the carriage 18 and the print head 19, ink discharge is performed from the used nozzle based on the printing data, and the transport unit 17 executes paper feeding once with the common transport amount between one pass and the next pass, According to this type of printing, the non-discharge of the ink by the defective nozzles is complemented by the normal nozzle, and a high-quality printing result is obtained in which there is no missing of the required dots on the printing medium 30.

The printing data is raster data in which an image is represented by a plurality of pixels, and for each pixel, dot discharge (dot on) or dot non-discharge (dot off) for each dot of CMYK ink is specified. In the printing data, a pixel row in which pixels are aligned along the main scanning direction D1 is referred to as a raster line. The control unit 11 can print one raster line on one nozzle 20 by assigning one raster line of dot data to one nozzle 20. Therefore, for the defective nozzle and the used nozzle that relate to the paired nozzle in the leading pass and the backward pass by the paper feeding according to the present exemplary embodiment, the control unit 11 assigns the raster line data to only the used nozzle, so that a high quality printing result can be output without missing dots due to the defective nozzles.

3. Second Exemplary Embodiment

Figure 6:
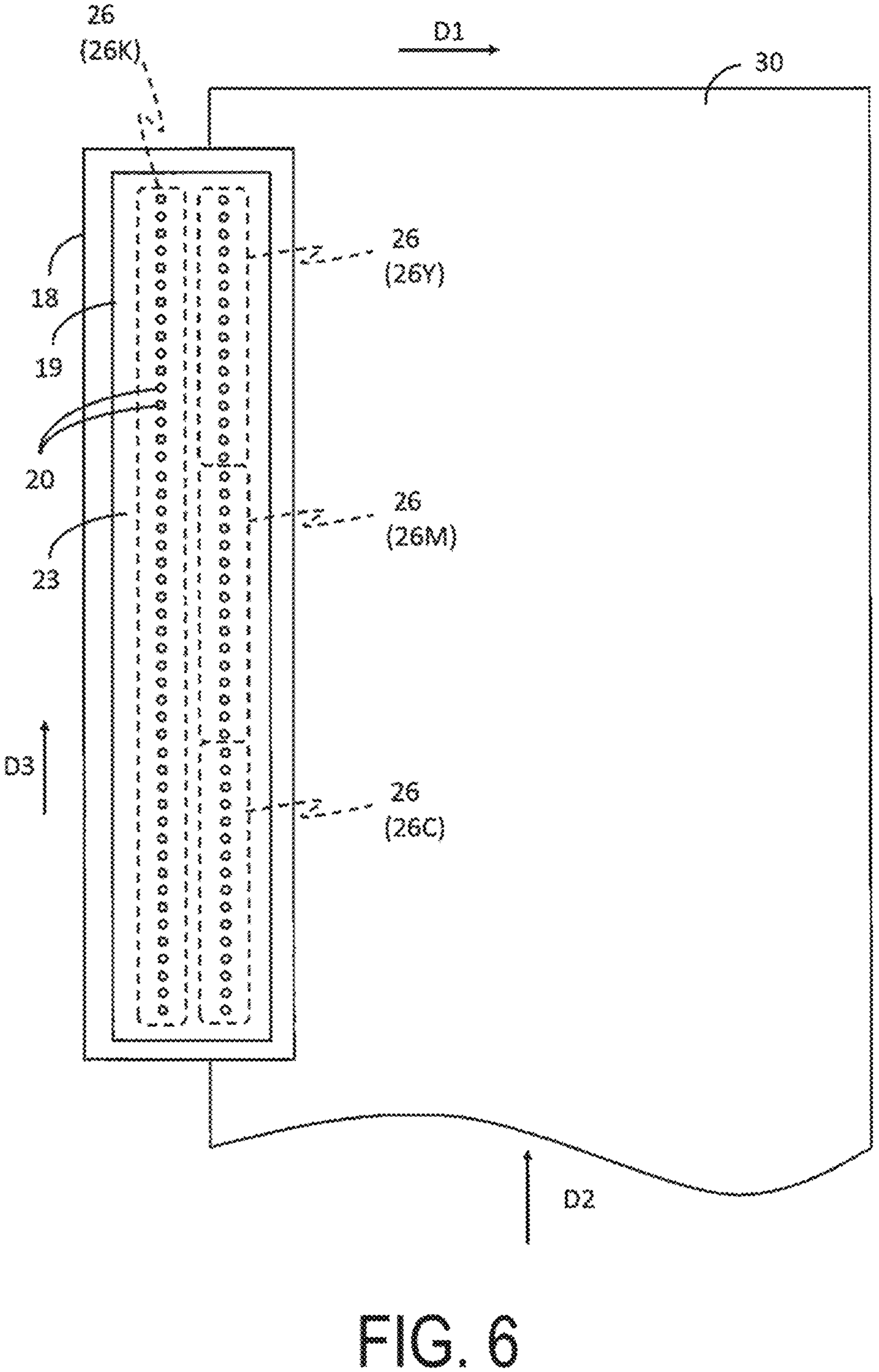
FIG. 6 is a diagram illustrating a relationship between the printing medium and a vertical array head, as seen from above.

FIG. 6 simply illustrates a relationship between the print head 19 and the printing medium 30 according to a second exemplary embodiment, as seen from above. The view of FIG. 6 is the same as that of FIG. 2. For FIG. 6, only the difference from FIG. 2 will be described. In the print head 19 illustrated in FIG. 6, the nozzle rows 26C, 26M, 26Y, which correspond to each of the chromatic nozzle rows, are arranged along the transport direction D2. From a different point of view, it can be said that the three nozzle rows 26C, 26M, 26Y are coupled to form one nozzle row. In the print head 19, the nozzle row 26K, which is a non-chromatic nozzle row, is arranged side by side with the chromatic nozzle row in the main scanning direction D1. The nozzle row 26K in FIG. 6 has the same length and the same position in the transport direction D2 as the nozzle row in which the nozzle rows 26C, 26M, 26Y are coupled. The print head 19 having a configuration in which the plurality of nozzle rows 26C, 26M, 26Y for each chromatic color are aligned along the transport direction D2 is referred to as a "vertical array head". In the vertical array head, the nozzle row position is a different position in the transport direction D2.

Figure 7:
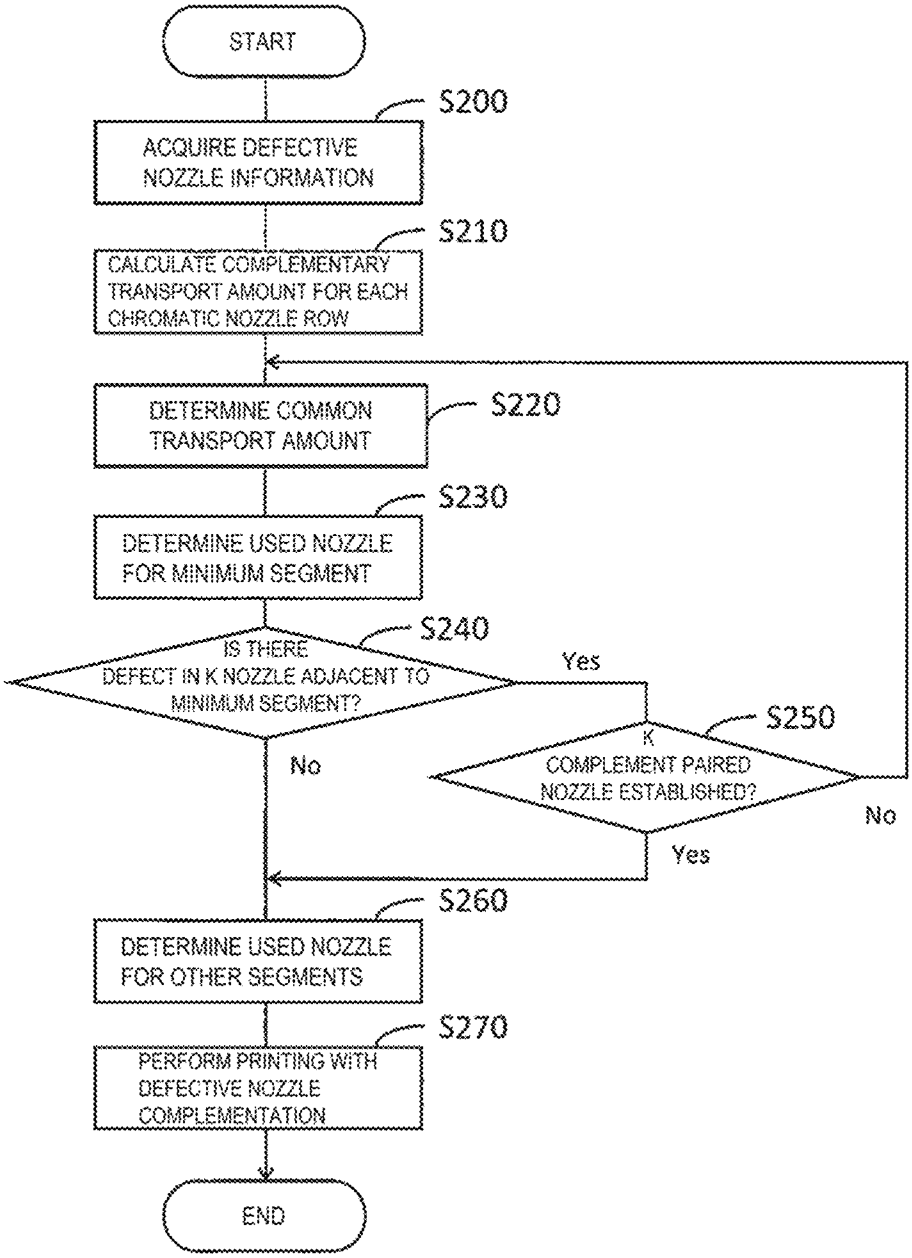
FIG. 7 is a flowchart illustrating a print control process of a second exemplary embodiment.

FIG. 7 illustrates, by a flowchart, a printing control process according to the second exemplary embodiment executed by the control unit 11 according to the program 12. In the second exemplary embodiment, the print head 19 is a vertical array head. In the description of the second exemplary embodiment, the description of the first exemplary embodiment is applied accordingly. Step S200 is the same as step S100 of FIG. 3.

In step S210, similar to step S110, the control unit 11 calculates a complementary transport amount for each nozzle row 26 with reference to the defective nozzle information. However, in step S210, the control unit 11 calculates the complementary transport amount for each of the nozzle rows 26C, 26M, 26Y, which are chromatic nozzle rows. Here, as a complementary transport amount for each of the nozzle rows 26C, 26M, 26Y, the complementary transport amounts Fc, Fm, Fy described in FIG. 4 have been calculated.

In step S220, the control unit 11 determines the common transport amount F based on the complementary transport amount for each of the chromatic nozzle rows calculated in step S210. Similar to the first exemplary embodiment, the control unit 11 may determine the smallest complementary transport amount Fm among the complementary transport amounts Fc, Fm, Fy to the common transport amount F.

In step 230, the control unit 11 determines the used nozzle when printing using the common transport amount F determined in step S220 for the nozzle row 26 corresponding to the "minimum segment". The minimum segment is a nozzle row 26 having a smallest complementary transport amount of the chromatic nozzle row, and here, corresponding to the nozzle row 26M. As illustrated in FIG. 5, the used nozzles in the nozzle row 26M are nozzles 20 of the nozzle numbers #1, #2, #4 to #8, #11.

In step S240, the control unit 11 determines whether there is a defective nozzle in a K nozzle adjacent to the used nozzle determined for the minimum segment with reference to the defective nozzle information. The K nozzle is a name for the nozzle 20 constituting the nozzle row 26K. In the second exemplary embodiment, for the used nozzle in the nozzle row 26K, the control unit 11 determines a normal nozzle of the K nozzle adjacent to the used nozzle determined by each of the nozzle rows 26C, 26M, 26Y to be the used nozzle. The term "adjacent" refers to the same position in the transport direction D2. In step S240, the control unit 11 proceeds to step S250 from the determination of "Yes" when there is a defective nozzle in the K nozzle adjacent to the used nozzle determined for the minimum segment, on the other hand, the control unit 11 proceeds to step S260 when there is no defective nozzle in such a K nozzle.

The process of FIG. 7 will be described with reference to FIG. 8.

Figure 8:
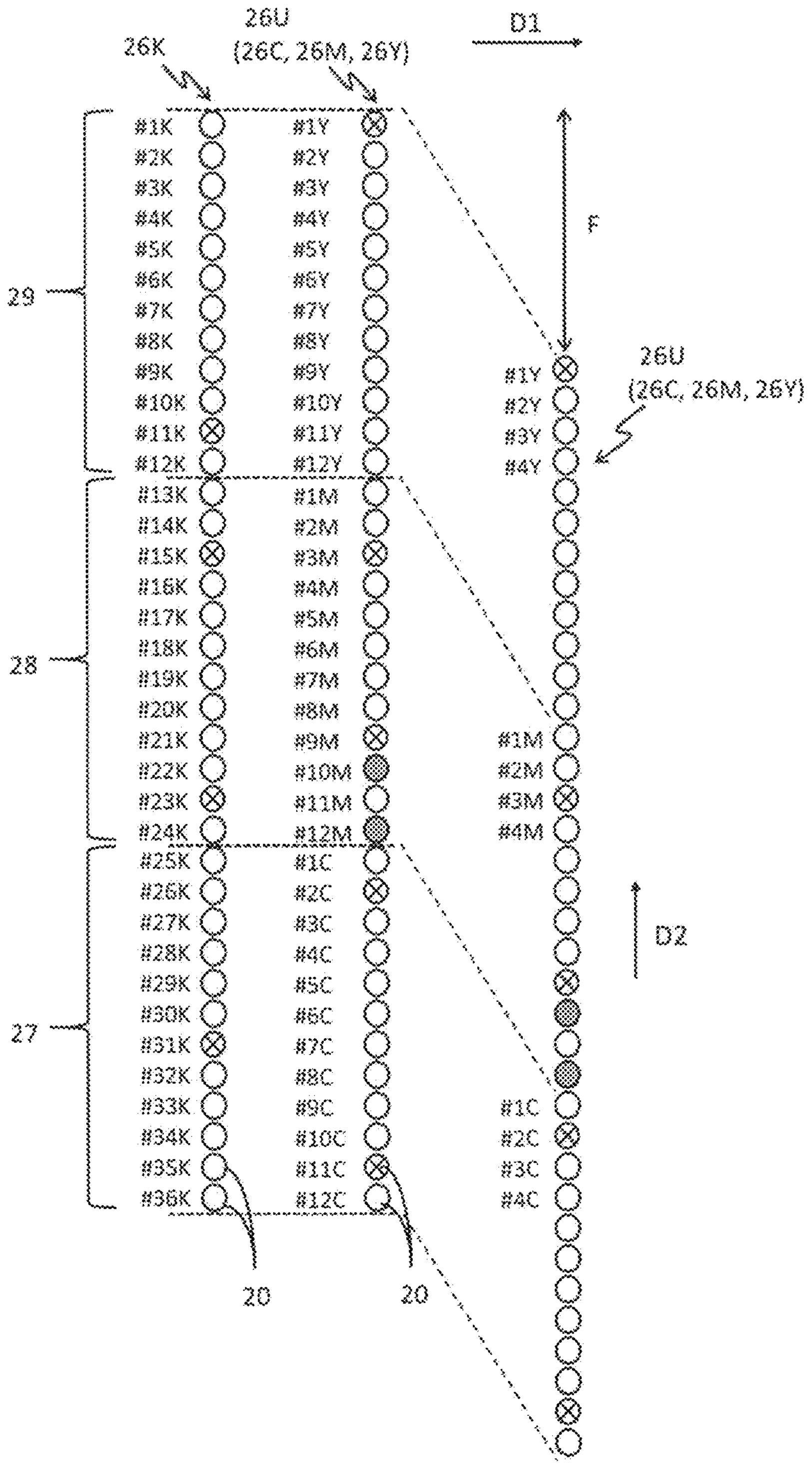
FIG. 8 is a diagram illustrating a used nozzle, an unused nozzle, etc. in the nozzle row of a minimum segment.

FIG. 8, similar to FIG. 5, illustrates that the relative positions of the nozzle rows 26C, 26M, 26Y, 26K in the transport direction D2 and the printing medium 30 vary for each pass by the paper feeding by the common transport amount F. The view of FIG. 8 is basically the same as FIG. 5. The reference sign 26U is a reference sign that refers to the nozzle rows 26C, 26M, 26Y, and is referred to here as a chromatic nozzle row unit 26U. Additionally, in FIG. 8, the nozzles numbers #1 to 12 of the 12 nozzles 20 constituting each of the nozzle rows 26C, 26M, 26Y are indicated by adding C, M, Y representing the corresponding ink. For example, the nozzle 20 of the nozzle number #1 in the nozzle row 26C is designated as the nozzle number #1C.

In FIG. 8, the 36 K nozzles constituting the nozzle row 26K are numbered by the nozzles as nozzle numbers #1K, #2K, #3K . . . #36K from downstream to upstream. In addition, in FIG. 8, in the chromatic nozzle row unit 26U and the nozzle row 26K, a range along the transport direction D2 corresponding to the nozzle row 26C is a first nozzle range 27, a range along the transport direction D2 corresponding to the nozzle row 26M is a second nozzle range 28, and a range along the transport direction D2 corresponding to the nozzle row 26Y is a third nozzle range 29. In FIG. 8, the chromatic nozzle row unit 26U and the nozzle row 26K corresponding to the leading pass are illustrated, while the nozzle row 26K of the chromatic nozzle row unit 26U and the nozzle row 26K corresponding to the backward pass is omitted.

The position of the defective nozzles in each of the nozzle rows 26C, 26M, 26Y illustrated in FIG. 8 are the same as those in the example of FIG. 4, 5. Therefore, the feature wherein the transport amount F determined in step S220 is the distance of 8 times the nozzle pitch, and the used nozzle and unused nozzle determined in step S230 for the nozzle row 26M are the same as in the example of FIG. 5. On the other hand, in the nozzle row 26K illustrated in FIG. 8, each of the K nozzles of the nozzle numbers #11K, #15K, #23K, #31K are defective nozzles.

According to FIG. 8, in step S230, the control unit 11 determines the nozzles 20 of the nozzle numbers #1M, #2M, #4M to #8M, #11M of the nozzle row 26M, which is the smallest segment, to be the used nozzles. Thus, the K nozzle adjacent to these used nozzles is each K nozzle of nozzle number #13K, #14K, #16 K to #20K, #23K. Then, in FIG. 8, among the K nozzles adjacent to these used nozzles, the K nozzle of the nozzle number #23K is the defective nozzle, and thus "Yes" is determined in step S240.

In step S250, for the defective nozzle among the K nozzle adjacent to the used nozzle in the smallest segment, the control unit 11 determines whether the paired nozzle of the defective nozzle and the normal nozzle having a complementary relationship is established. As described above, the defective nozzle of the K nozzle adjacent to the used nozzle of the minimum segment is the K nozzle of the nozzle number #23K. Furthermore, a K nozzle that can be formed into the paired nozzle with this K nozzle is a K nozzle located at a position that is an integral multiple of the transport amount F from the nozzle number #23K, and specifically, is each K nozzle of the nozzle numbers #31K, #15K, #7K. If all of the K nozzles of the nozzle numbers #31K, #15K, #7K are the defective nozzles, the control unit 11 determines "No" in step S250 because there is no normal nozzle that can complement the K nozzle of the nozzle number #23K.

In FIG. 8, among the K nozzles of the nozzle numbers #31K, #15K, #7K, the K nozzle of the nozzle number #7K is the normal nozzle. Therefore, because the pair of the nozzle number #23K and the normal nozzle capable of complementing this nozzle is established, the control unit 11 determines "Yes" in step S250 and proceeds to step S260.

In step S260, the control unit 11 determines the used nozzle for each of the other segments that are not the minimum segment, that is, in the example of FIG. 8, for each of the nozzle rows 26C and 26Y. In each of the chromatic nozzle rows, the control unit 11 may determine the used nozzle so that the printing result of the nozzles 20 having the same color corresponding to the common transport amount F is coupled to the transport direction D2. For example, as the nozzles 20 of nozzle numbers #1, #3 to #8, #10 are determined in the nozzle row 26C to be the used nozzles in the first exemplary embodiment, also in step S260, each nozzle 20 of the nozzle numbers #1C, #3C to #8C, #10C can be determined as the used nozzle in the nozzle row 26C. Similarly, as the nozzles 20 of the nozzle numbers #2 to #9 in the nozzle row 26Y are determined to be the used nozzles in the first exemplary embodiment, also in step S260, each nozzle 20 of the nozzle numbers #2 Y to #9 Y can be determined as the used nozzle in the nozzle row 26Y.

Note that in step S260, the control unit 11 determines the used nozzle so that the normal nozzle that complements the defective nozzle adjacent to the used nozzle of the minimum segment falls within the range of the used nozzle. In the example of FIG. 8, the K nozzle of the nozzle number #23K should be complemented by the K nozzle of the nozzle number #7K of the third nozzle range 29. Thus, with respect to the nozzle row 26Y, the control unit 11 determines the used nozzle so that the nozzles 20 of the nozzle number #7Y, which are adjacent to the nozzle number #7K, are included in the used nozzle. Further, in step S260, the control unit 11 determines the used nozzle so that the defective nozzle of the K nozzle does not fall within the range of the used nozzle as possible. In the example of FIG. 8, the K nozzle of the nozzle number #11K in the third nozzle range 29 is the defective nozzle, so that with regard to the nozzle row 26Y, the control unit 11 may preferably determine the used nozzle separately from the nozzle 20 of the nozzle number #11Y that is adjacent to the nozzle number #11K.

When "No" is determined in step S240, no matter how many defective nozzles are included in the K nozzles corresponding to the other segments, those defective nozzles can be complemented with the K nozzles corresponding to the minimum segment. Therefore, in step S260 of determining "No" in step S240 and executing, when determining the used nozzle in each of the other segments, there is a low need to determine the used nozzle in consideration of the K nozzle as described above, and the degree of freedom of determination of the used nozzle is increased.

In step S270, the control unit 11 adopts the common transport amount determined in step S220, and performs printing based on the printing data by controlling the transport unit 17, the carriage 18, and the print head 19 using the used nozzle determined in each nozzle row 26C, 26M, 26Y in steps S230 and S260, and the K nozzle which is the normal nozzle adjacent to these used nozzles. According to this type of printing, the non-discharge of the ink by the defective nozzles is complemented by the normal nozzle, and a high-quality printing result is obtained in which there is no missing of the required dots on the printing medium 30.

As illustrated in FIG. 7, when the control unit 11 determines "No" in step S250, the control unit 11 returns to step S220. In step S220, returning from step S250, the common transport amount is adjusted. In step S220 in this case, the control unit 11 determines a transport amount smaller than the common transport amount determined in the previous step S220 as a common transport amount. In addition, the common transport amount is determined so that the paired nozzle of the defective nozzles does not occur in each of the nozzle rows 26C, 26M, 26Y. The control unit 11 may determine the used nozzle having the minimum segment in step S230 in accordance with the adjusted transport amount, and perform step S240 and subsequent steps. In this way, in the flowchart of FIG. 7, the control unit 11 determines the common transport amount based on the complementary transport amount for each of the chromatic nozzle rows and the position of the defective nozzles in the non-chromatic nozzle row.

Figure 9:
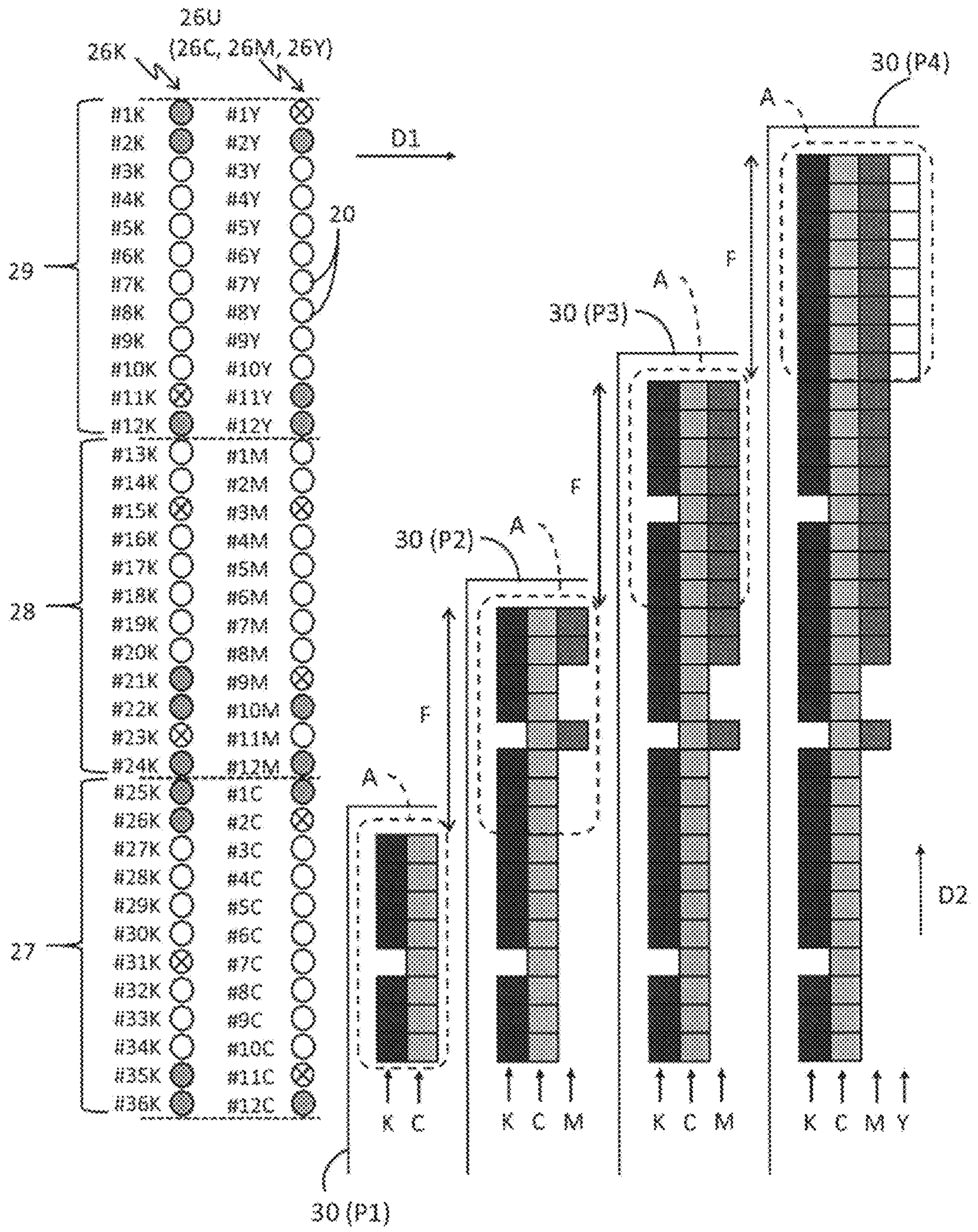
FIG. 9 is a diagram illustrating step S270 after step S260.

FIG. 9 is a diagram for describing step S270 executed after step S260. FIG. 9 illustrates a vertical array head according to the chromatic nozzle row unit 26U and the nozzle row 26K as in FIG. 8. In the nozzle rows 26C and 26Y illustrated in FIG. 9, the used nozzle is determined. In the example of FIG. 9, 8 continuous normal nozzles of the nozzle numbers #3C to #10C in the nozzle row 26C are the used nozzles. In addition, in the example of FIG. 9, in the nozzle row 26Y, the 8 continuous normal nozzles of the nozzle numbers #3Y to #10Y are the used nozzles. Also, in each of the first nozzle range 27, second nozzle range 28, and third nozzle range 29, the normal nozzle, which is the K nozzle adjacent to the used nozzle determined by the chromatic nozzle row, is determined to be the used nozzle in the nozzle row 26K.

Further, FIG. 9 illustrates a part of the printing medium 30 transported downstream at the common transport amount F each time the pass ends by receiving ink discharge in accordance with the printing data in each pass such as passes P1, P2, P3, P4. Each rectangle in the printing medium 30 in FIG. 9 indicates each dot discharged from the nozzle 20. Of course, the actual dots are not rectangular, but are illustrated here simply as rectangular. Additionally, in FIG. 9, the dots for each KCMY ink can be identified by changing the concentration of the rectangle. In the actual printing, each dot in the KCMY ink overlaps in the printing medium 30, but in FIG. 9, the dots for each ink does not overlap and are shifted to the main scanning direction D1.

Attention is given to a region A in the printing medium 30. According to the example of FIG. 9, in the first pass P1, dots of the K ink and dots of the C ink are discharged into the region A by the used nozzle of the K nozzles in the first nozzle range 27 and the used nozzle of the nozzle row 26C. As a result, there is no missing dot in the C ink in the region A, and the printing medium 30 is paper-fed with the transport amount F and receives the pass P2 in a state where there is no dot missing corresponding to the defective nozzle of the nozzle number #31K. In the pass P2, among the used nozzles in the nozzle row 26M, the dots of the M ink are discharged into the region A by each of the nozzles 20 of the nozzle numbers #7M, #8M, #11M.

In the pass P3 that has passed the paper feeding after the pass P2, among the used nozzles in the nozzle row 26M, the dots of the M ink are discharged into the region A by each of the nozzles 20 of the nozzle numbers #1M, #2M, #4M to #6M. In other words, the pass P2 and the pass P3 complete the discharge of the M ink relative to the region A. At this time, ink non-discharge by the defective nozzle of the nozzle number #9M is complemented by the used nozzle of the nozzle number #1M, and ink non-discharge by the defective nozzle of the nozzle number #3M is complemented by the used nozzle of the nozzle number #11M.

In the pass P4 that has passed the paper feeding after the pass P3, the dots of the K ink and the dots of the Y ink are discharged into the region A by the K nozzles of the nozzle number #7K of the third nozzle region 29 and the used nozzle of the nozzle row 26Y. As a result, in the region A, the missing dot corresponding to the defective nozzle of the nozzle number #31K is filled, and all of the KCMY ink printing is completed. Needless to say, rather than focusing almost all of the timing of the pass P1 as in the example of FIG. 9, discharge of the K ink to the region A may be distributed to each pass by using the used nozzles by the K nozzles in the second nozzle range 28 and the third nozzle range 29.

Also, in the example of FIG. 9, the entire region A is filled with dots for each of the KCMY inks, but in practice, whether each used nozzle actually discharges dots depends on the contents of the printing data. In any case, according to the present exemplary embodiment, it is avoided that the dots specified as the printing data to be discharged are not discharged due to the defective nozzle and that the dots are missing in the printing result.

4. Summary

As described above, according to the present exemplary embodiment, the printing apparatus 10 includes the transport unit 17 configured to transport the printing medium 30 in the transport direction D2, the print head 19 including the nozzle row 26 at each of the plurality of nozzle row positions, the nozzle row 26 being constituted by the plurality of nozzles 20 configured to discharge ink onto the printing medium 30, the scanning unit configured to move the print head 19 in the main scanning direction D1 that intersects with the transport direction D2, the control unit 11 configured to control the transport unit 17, the print head 19, and the scanning unit, and the defective nozzle detection unit 21 configured to detect the defective nozzle failing to discharge ink from the plurality of nozzles 20 included in the print head 19. Then, the printing apparatus 10 performs printing on the printing medium 30 by the combination of the transport by the transport unit 17 and the main scanning for discharging the ink by the print head 19 based on the printing data in association with the movement of the scanning unit. The control unit 11 is configured to calculate, based on a positional relationship between the defective nozzle and a normal nozzle that is not the defective nozzle included in the nozzle row 26 in the transport direction D2, a one-time transport amount by the transport unit 17 for each nozzle row 26 at each of the nozzle row positions, the one-time transport amount being a complementary transport amount at which non-discharge of ink by the defective nozzle is complementable by discharge of ink by the normal nozzle, based on a relationship between the main scanning before the transport and the main scanning after the transport, determine a common transport amount to the nozzle rows 26 at the respective nozzle row positions based on the complementary transport amount for each nozzle row 26, and perform the printing by adopting the determined common transport amount as the one-time transport amount by the transport unit 17.

According to this configuration, the control unit 11 calculates the complementary transport amount for each nozzle row 26 at each of the nozzle row positions, and determines the common transport amount to each nozzle row 26 based on the complementary transport amount thereof. This makes it easy to ensure a large transport amount as possible as a common transport amount. Therefore, an increase in the number of passes required for printing completion by limiting the range of the used nozzles can be suppressed as much as possible, and a decrease in the printing speed is easily avoided.

In particular, in the present exemplary embodiment, when the complementary transport amount is calculated for each nozzle row 26 at each of the nozzle row positions, the maximum complementary transport amount is calculated for each nozzle row 26. Therefore, the common transport amount to each nozzle row 26 determined based on the complementary transport amount for each nozzle row 26 is also the largest possible transport amount, and it is possible to suppress an increase in the number of passes in a situation where printing is performed while complementing the defective nozzles with the normal nozzles.

In addition, according to the present exemplary embodiment, the print head 19 may be the horizontal array head or the vertical array head.

At the vertical array head, each chromatic nozzle row serving as each nozzle row at each of the plurality of chromatic inks is arranged along the transport direction D2, and the non-chromatic nozzle row corresponding to the non-chromatic ink is arranged side by side with the chromatic nozzle row in the main scanning direction D1.

Then, the control unit 11 may calculate the complementary transport amount for each chromatic nozzle row, and determine the common transport amount based on the complementary transport amount for each chromatic nozzle row and the position of the defective nozzles in the non-chromatic nozzle row.

According to the configuration, in the case where the vertical array head is used, it is possible to determine an appropriate transport amount that can complement or avoid ink non-discharge due to the defective nozzles in both the chromatic nozzle row and the non-chromatic nozzle row.

The present exemplary embodiment is not limited to the printing apparatus 10 and the system, and discloses inventions of various categories such as a method executed by the apparatus and the system and the program 12 for causing the processor to execute the method.

A printing method for performing printing on the printing medium 30 by the combination of the transport of the printing medium 30 in the transport direction D2 and the main scanning for discharging ink by the print head 19 based on the printing data in association with the movement of the print head 19 in the main scanning direction D1 that intersects with the transport direction D2, the print head 19 including the nozzle row 26 at each of the plurality of nozzle row positions, the nozzle row 26 being constituted by the plurality of nozzles 20 configured to discharge ink onto the printing medium, 30 the method including a defective nozzle detection step for detecting the defective nozzle failing to discharge ink from the plurality of nozzles 20 included in the print head 19, a calculation step for calculating, based on a positional relationship between the defective nozzle and the normal nozzle that is not the defective nozzle included in the nozzle row in the transport direction D2, a one-time transport amount of the printing medium 30 for each nozzle row 26 at each of the nozzle row positions, the one-time transport amount being a complementary transport amount at which non-discharge of ink by the defective nozzle is complementable by discharge of ink by the normal nozzle, based on a relationship between the main scanning before the transport and the main scanning after the transport, a determination step for determining a common transport amount to the nozzle rows 26 at the respective nozzle row positions based on the complementary transport amount for each nozzle row 26, and a printing step for performing the printing by adopting the determined common transport amount as the one-time transport amount. According to the above description, the defective nozzle detection step is performed by the defective nozzle detection unit 21. Furthermore, step S110 in FIG. 3 or step S210 in FIG. 7 corresponds to the calculation step, and step S120 and step S220 correspond to the determination step, and step S140 and step S270 correspond to the printing step.

5. Other Exemplary Embodiments

The control unit 11 may cause the normal nozzle adjacent to the defective nozzle in the nozzle row 26 to discharge ink that complements at least part of the ink non-discharge by the defective nozzle. Such a process is referred to as neighbor complementation. The term "adjacent" referred to here means the neighbor in the transport direction D2. The control unit 11 may perform the neighbor complementation in step S140 or step S270. As an example, attention is given to the defective nozzle of the nozzle number #2 in the nozzle row 26C in FIG. 5. According to FIG. 5, in order to complement the non-discharge of ink by the defective nozzle, the control unit 11 assigns the printing data for one raster line to the normal nozzle of the nozzle number #10 of the nozzle row 26C, which is the paired nozzle with the defective nozzle. At this time, the control unit 11 further assigns the printing data for discharging ink to the normal nozzle of the nozzle number #1 near the defective nozzle of the nozzle number #2, and the normal nozzle of the nozzle number #3.

The printing data that causes excess ink to be discharged is, in the example described above, data that causes a large amount of dots to be discharged than the raster line data originally assigned to each normal nozzle of the nozzle numbers #1, #3 of the nozzle row 26C. By performing such neighbor complementation, non-discharge of the ink by the defective nozzle can be complemented by the plurality of normal nozzles as well as the normal nozzle that is the paired nozzle with the defective nozzle. Additionally, by using the combination of the neighbor complementation, the amount of ink discharged for the complementation of the defective nozzle can be reduced in the normal nozzle that is the paired nozzle with the defective nozzle.

The control unit 11 may be configured to cause, in the nozzle row 26, a plurality of the normal nozzles to perform overlap printing of a common raster line to the main scanning before the transport and the main scanning after the transport, the plurality of the normal nozzles being in a positional relationship in which the plurality of the normal nozzles are configured to perform printing of the common raster line extending in the main scanning direction D1 and configured to constitute the printing data. As is known, overlap printing is a process in which one raster line is shared and printed with the plurality of nozzles 20. The control unit 11 may perform the overlap printing in step S140 and step S270. The plurality of the normal nozzles being in a positional relationship in which the plurality of the normal nozzles are configured to perform printing of the common raster line, are the paired nozzles of the normal nozzles, as illustrated in the previous description.

For example, the normal nozzle of the nozzle number #10 (#10M) and the normal nozzle of the nozzle number #2 (#2M) in the nozzle row 26M form the paired nozzle. Also, for example, in the nozzle row K in FIG. 5, the normal nozzles of the nozzle numbers #9, #1, the normal nozzles of the nozzle numbers #10, #2, the normal nozzles of the nozzle numbers #11, #3, and the normal nozzle of the nozzle numbers #12, #4 respectively form the paired nozzles. With respect to such a paired nozzle, the control unit 11 performs overlap printing by assigning data of some pixels out of data of the plurality of pixels constituting the raster line for allocation to the pair of used nozzles to the normal nozzles that have been used as the unused nozzles in the previous description.

In the overlap printing, the allocation ratio of pixels in the raster line to two normal nozzles forming the paired nozzle may not be 50% to 50%, for example 20% to 80%, 60% to 40%, etc. In addition, the control unit 11 may have such an allocation ratio different for each raster line to be overlap-printed. By making the allocation ratio different from each raster line to be overlap-printed, the image quality can be improved by ensuring gradation in a region where the raster lines to be overlap-printed are continuous in the transport direction D2.

Note that the complementation of the defective nozzle by the normal nozzle does not need to be executed if it is not necessary to discharge the ink with the defective nozzle.

Thus, the control unit 11 is configured to perform the printing by adopting a common transport amount based on the complementary transport amount as a one-time transport amount by the transport unit 17, when a raster line assigned to the defective nozzle includes data of ink to be discharged, the raster line extending in the main scanning direction D1 and configured to constitute the printing data. On the other hand, the control unit 11 may be configured to perform the printing by adopting a transport amount at which non-discharge of ink by the defective nozzle cannot be complemented by discharging ink by the normal nozzle as the one-time transport amount by the transport unit 17, the transport amount being greater than a common transport amount based on the complementary transport amount, when a raster line assigned to the defective nozzle does not include data of ink to be discharged.

Figure 10:
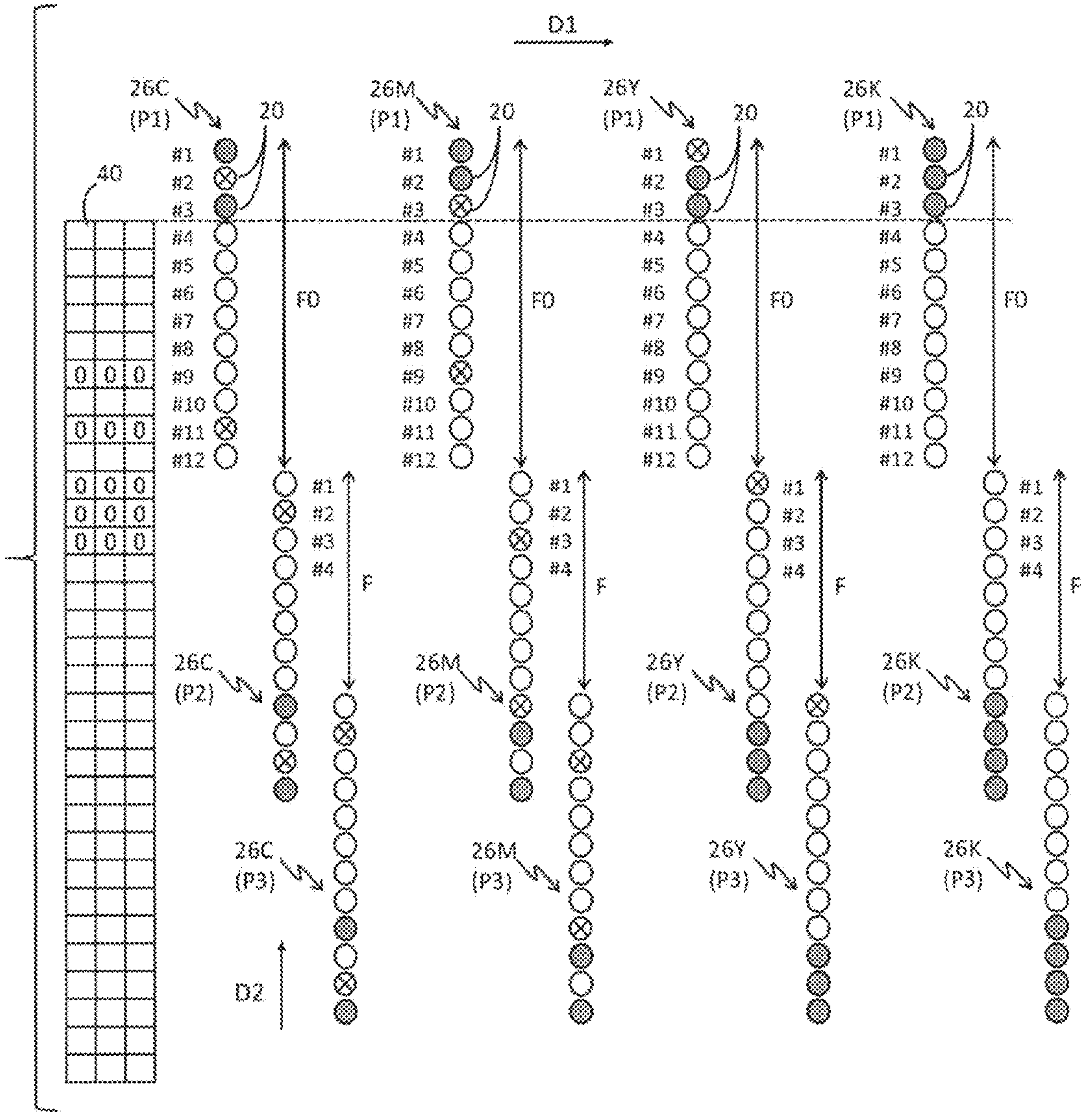
FIG. 10 is a diagram illustrating paper feeding for not complementing a defective nozzle and paper feeding for complementing the defective nozzle.

FIG. 10 is a representation similar to that illustrated in FIG. 5 to indicate that the relative positions of the nozzle rows 26C, 26M, 26Y, 26K in the transport direction D2 and the printing medium 30 vary for each pass. Also, in FIG. 10, part of the printing data 40 is also illustrated together. The individual rectangles constituting the printing data 40 are individual pixels, each pixel having dot on data and dot off data for each CMYK ink.

In FIG. 10, a transport amount F0 corresponds to the length of the nozzle row 26, and is greatest as the one-time paper feeding amount. The transport amount F0 is an example of a transport amount that cannot complement the ink non-discharge by the defective nozzles due to the discharge of the ink of the normal nozzle, and is an example of a transport amount greater than the common transport amount F determined in step S120 or step S220. The control unit 11 is configured to analyze the printing data, and determine whether the raster line assigned to the defective nozzle does not have the data of ink to be discharged if the transport amount F0 is adopted as the paper feeding amount.

In the printing data 40, a raster line formed from a pixel that describes "0" is a raster line that does not have dot on data. In a case where the raster line assigned to each of the defective nozzles is a raster line that does not have dot on data when the paper feeding amount between the pass P1 and the pass P2 is set as the transport amount F0 as illustrated in FIG. 10, in actual printing, the control unit 11 may set the paper feeding amount between the pass P1 and the pass P2 to the transport amount F0. By adopting the transport amount F0, the number of passes required for completion of printing can be reduced, and the printing speed can be improved. In the example of FIG. 10, the raster line assigned to the defective nozzle when the paper feeding amount between the pass P2 and the pass 3 is the transport amount F0 is the raster line having the dot on data, so that the paper feeding amount between the pass P2 and the pass P3 is the common transport amount F described above.

Such control of the transport amount is also possible in the vertical array head of the second exemplary embodiment. In the vertical array head, the individual lengths of the nozzle rows 26C, 26M, 26Y constituting the chromatic nozzle row unit 26U are the maximum value of the one-time paper feeding amount. Accordingly, when the control unit 11 executes paper feeding between passes with such maximum paper feeding amount, in a case where the raster line assigned to the defective nozzle is a raster line that does not have dot on data, the control unit 11 may adopt this maximum paper feeding amount in actual printing.

Further, the control of the transport amount can be performed in accordance with a correspondence relationship between the defective nozzles and the printing data at each nozzle row position. Referring to FIG. 10, it is assumed, for example, that the raster line assigned to the nozzle 20 of the nozzle number #9 in the pass P1 is data that defines the dot for the CYK ink, but does not define the dots of the M ink in all the pixels. In addition, it is assumed that the raster line assigned to the nozzle 20 of the nozzle number #11 in the pass P1 is data that defines a dot for the C ink. In this case, in the relationship between the pass P1 and the pass P2, the paper feeding to complement the defective nozzle of the nozzle number #9 of the nozzle row 26M by the normal nozzle is not required, but the paper feeding to complement the defective nozzle of the nozzle number #11 of the nozzle row 26C is required. Therefore, in accordance with the contents of the printing data, the control unit 11 may determine the transport amount that can complement the defective nozzle that needs to be complemented by the normal nozzle for each of the passes, and may adopt it in actual printing.

What is claimed is:

1. A printing apparatus comprising:

a transport unit configured to transport a printing medium in a transport direction;

a print head including a nozzle row at each of a plurality of nozzle row positions, the nozzle row being constituted by a plurality of nozzles configured to discharge ink onto the printing medium;

a scanning unit configured to move the print head in a main scanning direction that intersects with the transport direction;

a control unit configured to control the transport unit, the print head, and the scanning unit; and a defective nozzle detection unit configured to detect a defective nozzle failing to discharge ink from a plurality of nozzles included in the print head, wherein the printing apparatus is configured to perform printing on the printing medium by a combination of transport by the transport unit and main scanning for discharging ink by the print head based on printing data in association with movement of the scanning unit, and the control unit is configured to:

calculate, based on a positional relationship between the defective nozzle and a normal nozzle that is not the defective nozzle included in the nozzle row in the transport direction that pairs the defective nozzle and the normal nozzle, a one-time transport amount by the transport unit for each nozzle row at each of the nozzle row positions, the one-time transport amount being a complementary transport amount at which non-discharge of ink by the defective nozzle is complementable by discharge of ink by the normal nozzle based on a relationship between the main scanning before the transport and the main scanning after the transport so that the paired defective nozzle and normal nozzle correspond to the same position during the main scanning before the transport and the main scanning after the transport, wherein a maximum complementary transport amount is based on the normal nozzle being a nozzle that is most upstream of the defective nozzle during the main scanning before the transport and a nozzle that is most downstream of the defective nozzle during the main scanning after the transport;

determine a common transport amount to the nozzle rows at the respective nozzle row positions based on the smallest complementary transport amount for each nozzle row;

perform the printing by adopting the determined common transport amount as the one-time transport amount by the transport unit; and adjust the common transport amount to smaller distance where a situation occurs in which the defective nozzles become the paired nozzle.

2. The printing apparatus according to claim 1, wherein the control unit is configured to cause the normal nozzle adjacent to the defective nozzle in the nozzle row to discharge ink that complements at least part of non-discharge of ink by the defective nozzle.

3. The printing apparatus according to claim 1, wherein the control unit is configured to cause a plurality of the normal nozzles to perform overlap printing of a common raster line by the main scanning before the transport and the main scanning after the transport, the plurality of the normal nozzles being in a positional relationship, in the nozzle row, in which the plurality of the normal nozzles are configured to perform printing of the common raster line, the common raster line extending in the main scanning direction and constituting the printing data.

4. The printing apparatus according to claim 1, wherein at the print head, each chromatic nozzle row serving as each nozzle row for each of a plurality of chromatic colors of ink is arranged along the transport direction, and a non-chromatic nozzle row corresponding to a non-chromatic color of ink is arranged side by side with the chromatic nozzle row in the main scanning direction, and the control unit is configured to calculate the complementary transport amount for each of the chromatic nozzle rows, and determine a common transport amount based on the complementary transport amount for each of the chromatic nozzle rows and a position of the defective nozzle in the non-chromatic nozzle row.

5. The printing apparatus according to claim 1, wherein the control unit is configured to:

perform the printing by adopting a common transport amount based on the complementary transport amount as a one-time transport amount by the transport unit when a raster line assigned to the defective nozzle includes data of ink to be discharged, the raster line extending in the main scanning direction and constituting the printing data; and perform the printing by adopting, as the one-time transport amount by the transport unit, a transport amount that is greater than a common transport amount based on the complementary transport amount and at which non-discharge of ink by the defective nozzle is not complementable by discharge of ink by the normal nozzle when a raster line assigned to the defective nozzle does not include data of ink to be discharged.

6. A printing method for performing printing on a printing medium by a combination of transport of a printing medium in a transport direction and main scanning for discharging ink by a print head based on printing data in association with movement of the print head in a main scanning direction that intersects with the transport direction, the print head including a nozzle row at each of a plurality of nozzle row positions, the nozzle row being constituted by a plurality of nozzles configured to discharge ink onto the printing medium, the method comprising:

a defective nozzle detection step for detecting a defective nozzle failing to discharge ink from a plurality of nozzles included in the print head;

a calculation step for calculating, based on a positional relationship between the defective nozzle and a normal nozzle that is not the defective nozzle included in the nozzle row in the transport direction that pairs the defective nozzle and the normal nozzle, a one-time transport amount of the printing medium for each nozzle row at each of the nozzle row positions, the one-time transport amount being a complementary transport amount at which non-discharge of ink by the defective nozzle is complementable by discharge of ink by the normal nozzle based on a relationship between the main scanning before the transport and the main scanning after the transport so that the paired defective nozzle and normal nozzle correspond to the same position during the main scanning before the transport and the main scanning after the transport, wherein a maximum complementary transport amount is based on the normal nozzle being a nozzle that is most upstream of the defective nozzle during the main scanning before the transport and a nozzle that is most downstream of the defective nozzle during the main scanning after the transport;

a determination step for determining a common transport amount to the nozzle rows at the respective nozzle row positions based on the smallest complementary transport amount for each nozzle row;

a printing step for performing the printing by adopting the determined common transport amount as the one-time transport amount; and an adjustment step the common transport amount to smaller distance where a situation occurs in which the defective nozzles become the paired nozzle.

* * * * *